Jan. 10, 1961

H. ROBERTS 2,967,640

PLUGS OR CLOSURES

Filed Jan. 27, 1958

INVENTOR
Henry Roberts
BY Dean, Fairbank & Hirsch
ATTORNEY

Jan. 10, 1961 H. ROBERTS 2,967,640
PLUGS OR CLOSURES
Filed Jan. 27, 1958 7 Sheets-Sheet 2
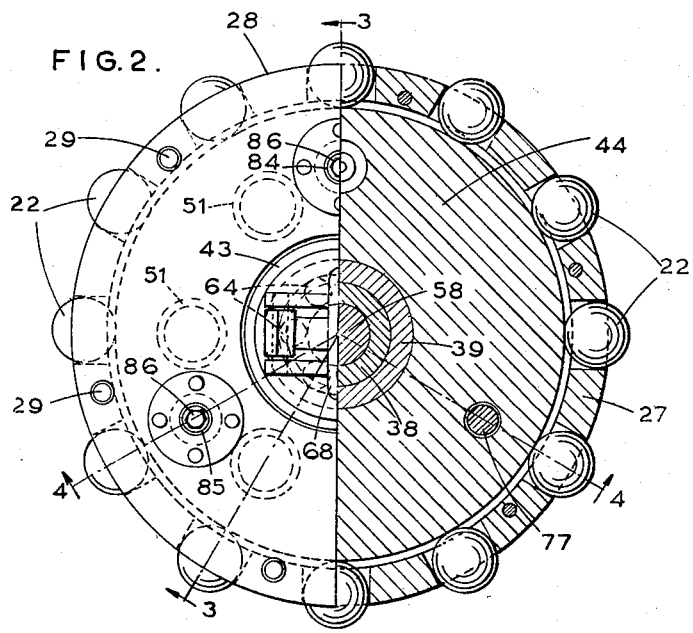
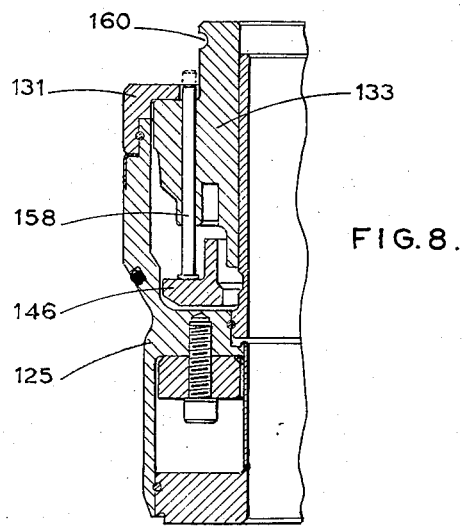
INVENTOR
Henry Roberts
BY Dean, Fairbank & Hirsch
ATTORNEY

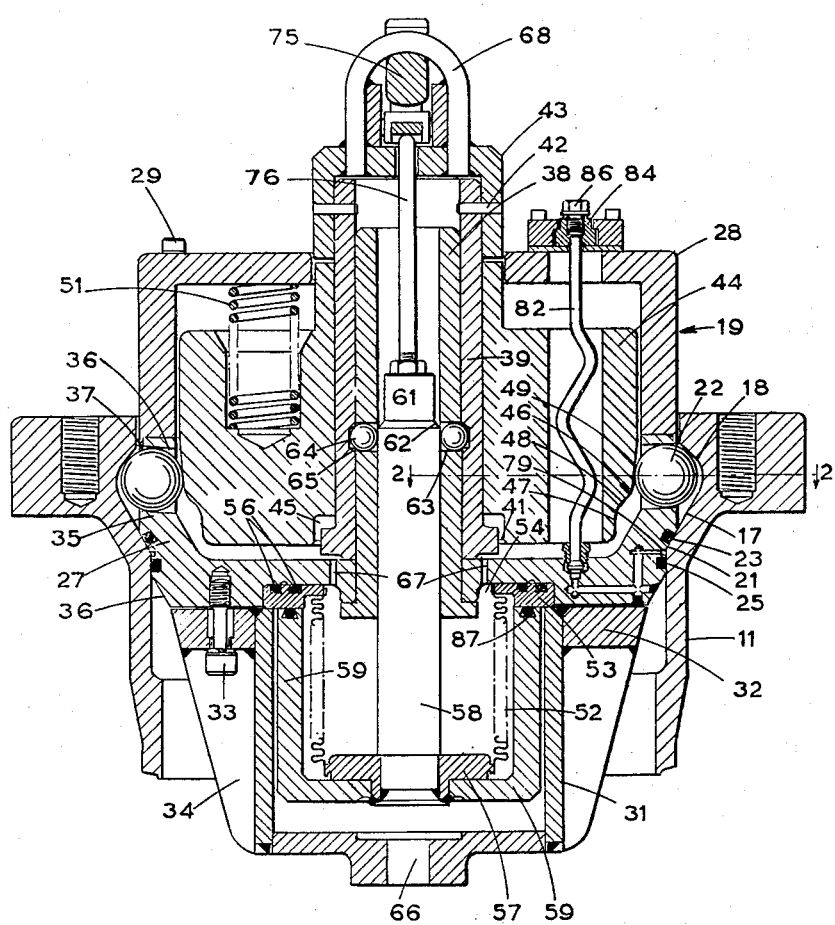

Jan. 10, 1961 H. ROBERTS 2,967,640
PLUGS OR CLOSURES
Filed Jan. 27, 1958 7 Sheets-Sheet 4

INVENTOR
Henry Roberts
BY
Dean, Fairbank & Hirsch
ATTORNEY

Jan. 10, 1961 H. ROBERTS 2,967,640
PLUGS OR CLOSURES
Filed Jan. 27, 1958 7 Sheets-Sheet 6

INVENTOR
Henry Roberts
BY
Dean, Fairbank & Hirsch
ATTORNEY

Jan. 10, 1961 H. ROBERTS 2,967,640
PLUGS OR CLOSURES
Filed Jan. 27, 1958 7 Sheets-Sheet 7

INVENTOR
Henry Roberts
BY
Dean, Fairbank & Hirsch
ATTORNEY

United States Patent Office 2,967,640
Patented Jan. 10, 1961

2,967,640

PLUGS OR CLOSURES

Henry Roberts, Bournemouth, England, assignor to Flight Refuelling Limited, Blandford, England, a British company Filed Jan. 27, 1958, Ser. No. 711,408

Claims priority, application Great Britain Feb. 6, 1957

10 Claims. (Cl. 220—55.3)

This invention relates to plugs for closing openings such as the bores of conduits, orifices and the like. The term "plugs" is intended to include not only members which themselves wholly block the openings in which they are mounted, but also members which, when located in the openings, provide a closable opening of smaller diameter for the passage of objects therethrough.

The object of the invention is to provide a plug which, whilst it is readily inserted or removed, is locked in position when inserted and cannot be forced out by pressure acting on its inner side.

A plug according to the invention comprises a body adapted to make a fluid-tight joint with a peripheral surface on the wall of an opening, closed by the plug, in a surrounding member, locking means for holding the plug in position in the surrounding member and including radially movable locking members in said body adapted to enter a circumferential groove in said wall, and a member movable axially in the body between positions in which it respectively holds the locking members in extended positions and allows them to retract and release the plug.

Further, according to the invention, a plug comprises a body having an inclined shoulder adapted to make a fluid tight joint with an inclined peripheral surface on the wall of an opening, closed by the plug, in a surrounding member, locking means for holding the plug in position in the surrounding member and including radially movable locking members in said body adapted to enter a circumferential groove in said wall and to co-operate with the side of said groove to produce an axial thrust urging the shoulder against the inclined surface, and a member movable axially in the body between positions in which it respectively exerts outward thrust on the locking members and allows them to retract and release the plug or closure.

The invention is hereinafter described with reference to the accompanying drawings, in which:

Figure 2 is a plan view of the plug shown in Figure 1 on a larger scale the right-hand half being in section on the line 2—2 of Figure 3;

Figure 3 is a sectional elevation on the line 3—3 of Figure 2, the plug, which provides complete closure of the stack-pipe, being locked in position in a stack-pipe;

Figure 8 is a scrap sectional elevation of the plug shown in Figures 6 and 7, on another radial plane;

Figure 1:
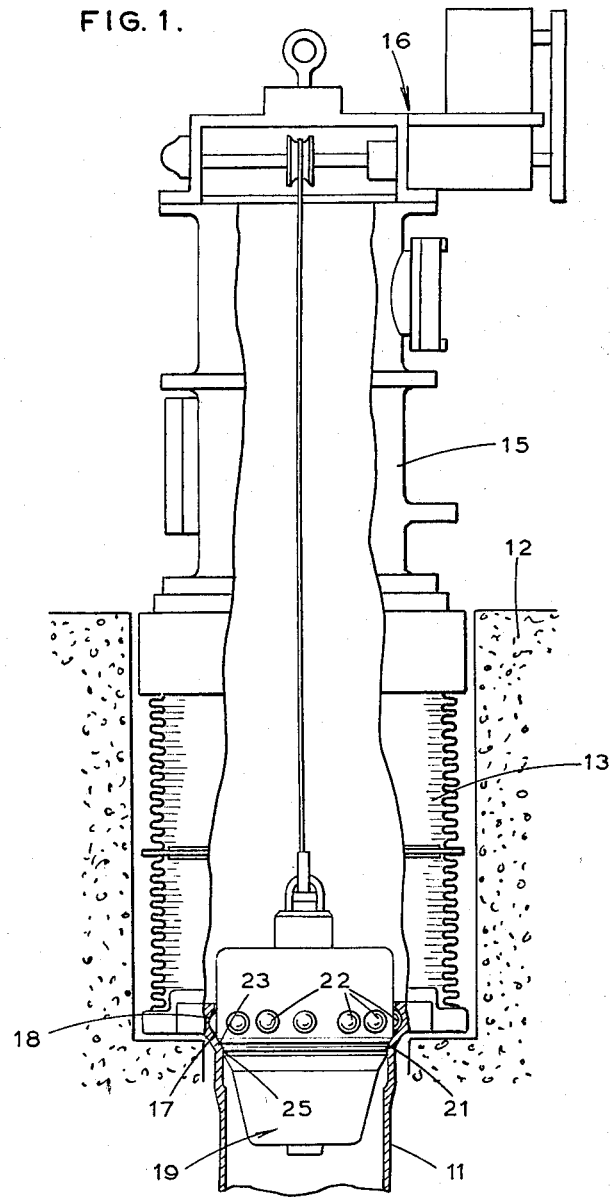
Figure 1 is a somewhat diagrammatic sectional view showing a plug according to the invention in position in a stack pipe providing ingress to the interior of an atomic reactor.

Referring to Figure 1, a stack pipe 11 forming a passage leading into an atomic reactor, the concrete sheathing of which is shown at 12, opens at its upper end into a longitudinally deformable coupling member 13, bolted to the stack pipe, which coupling member has a valve seat at its upper end adapted to co-operate with a valve closure member (not shown) to close the passage through the stack pipe. The valve closure member, which is operated by suitable mechanism not forming part of the present invention, moves, when the passage is opened, to one side of the said passage so as to offer no obstruction thereof. The upper end of the coupling member 13 is adapted to receive, and make a fluid-tight joint with, a dome unit 15 in which is mounted a winch 16, operable from the exterior of the dome unit. Thus when the dome unit 15 is in position and the valve closure member is unseated, the winch can be used to lower articles into, or lift articles from, the stack-pipe 11.

The stack-pipe 11, adjacent its upper end, is formed with an upwardly facing frusto-conical surface 17 about its inner wall, extending at its upper end into a circumferential groove 18. A plug 19 adapted to be positioned in the stack-pipe has a frusto-conical shoulder 21 which seats on the surface 17, and a ring of locking balls 22 which are projected radially, by means hereinafter described, to enter the groove 18, engage the upper side thereof, and press the shoulder 21 firmly against the surface 17. A packing ring 23 of round cross section, housed in a groove in the shoulder 21, is pressed against the surface 17 to provide a fluid-tight joint, and a similar packing ring 25 housed in a groove in a cylindrical part of the plug 19 engages a cylindrical portion of the wall of the stack-pipe below the surface 17.

Figure 4:
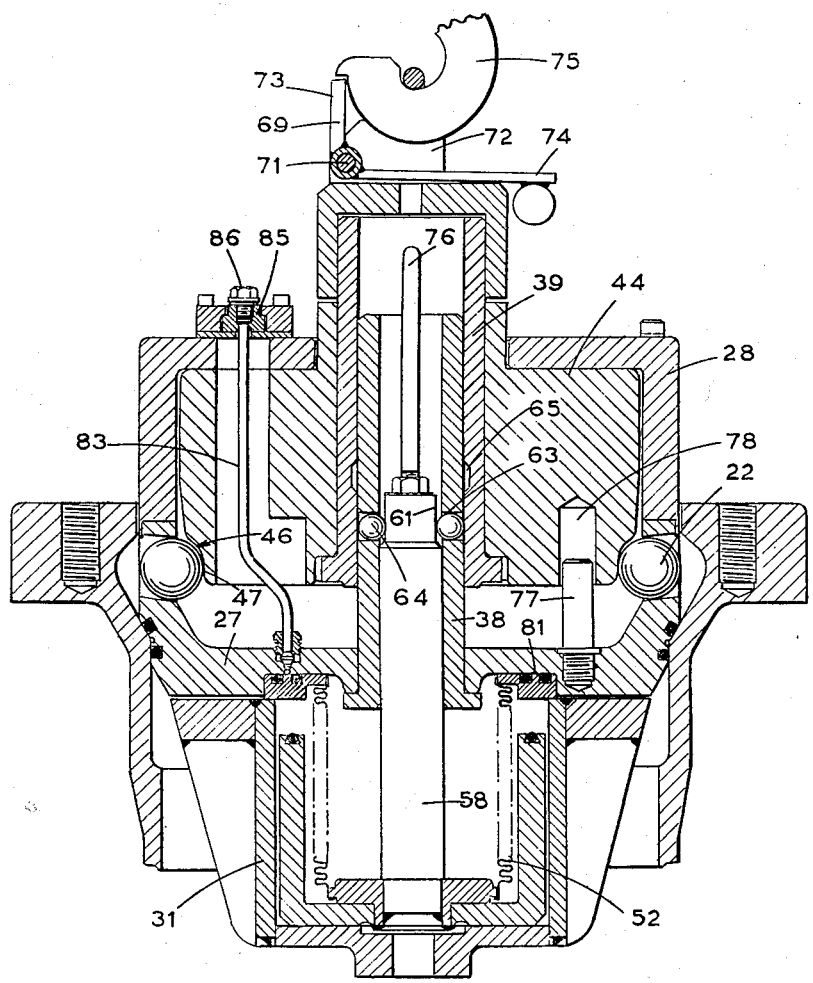
Figure 4 is a sectional elevation on the line 4—4 of Figure 2 showing the plug in the unlocked condition.

Referring now to Figures 2, 3 and 4 the plug 19 shown in those figures comprises a body including a shallow cup-shaped centre part 27, an upper inverted cup-shaped part 28 secured to the part 27 by screws 29, and a lower cup-shaped part 31 of smaller diameter than the centre part 27 and having a flange 32 welded to its rim, which flange is secured to the underside of the base of the centre part 27 by screws 33. Webs 34 welded to the exterior of the part 31 have upwardly and outwardly inclined outer edges, the line of which is continued upwardly by the edge of the flange 32. The outer peripheral wall of the centre part 27 includes an upper cylindrical portion 35 above the shoulder 21 which is formed thereon, and, below the cylindrical portion 19, which is also formed thereon, a tapered portion 36 the lower end of which has the same diameter as the upper face of the flange 32. The upper cylindrical portion 35 is formed with a number of radial holes 36, say twelve, in each of which is mounted a ball 22, having a diameter such that it is a free sliding fit in the hole. The upper edge of the portion 35 is relieved on its outer surface, and the upper cup-shaped part 28 has a lip 37 which extends downwardly over the relieved portion and over the upper edges of the holes 36, so as to limit outward movement of the balls 22.

A tubular stem 38 extends upwardly from the base of the centre part 27, through an opening in the centre of the upper cup-shaped part 28, and slidably mounted on the said stem 38 is a sleeve 39 having a flange 41 at its lower end and having secured to its upper end, as by radial dowels 42, a cap 43 into which the end of the sleeve 39 extends. An axially movable member in the form of a plunger 44 is mounted on the sleeve 39 so as to have a limited degree of sliding motion thereon between the flange 41 and the cap 43, the underside of the plunger 44 being recessed at 45 to receive the flange 41. Externally, the plunger 44 is formed with a camming surface 46 extending around its periphery to cooperate with the balls 22, the said camming surface including a lower substantially cylindrical portion 47 of such diameter as to allow the balls 22 to retract fully into the holes 36, a quick-lift portion 48 immediately above the portion 47 to produce quick outward movement of the balls with downward movement of the plunger, and a slightly downwardly tapered portion 49 above the quick-lift portion 48. The plunger 44 is urged downwardly by springs, one of which is shown at 51 located in recesses in its upper surface and abutting on the upper cup-shaped part 28.

Housed in the lower cup-shaped part 31 is a bellows 52 the upper end of which is secured in a fluid-tight manner to a rigid ring 53 clamped into a recess 54 in the base of the centre part 27 of the body by the flange 32, the ring 53 being formed with annular grooves to receive packing rings 56 which engage the surface of the recess 54 to form a fluid-tight joint. The lower end of the bellows 52 is secured in a fluid-tight manner to a disc 57 which carries a rod 58 extending upwardly into, and slidable in, the tubular stem 38. The rod 58 is moved upwardly by contraction of the bellows 52, and such upward movement is limited by a cup 59 secured to the disc 57 and adapted to engage at its rim with the ring 53 when the bellows are contracted to a predetermined extent.

The rod 58, at its upper end, has a reduced portion 61 connected to the full-diameter portion by a frusto-conical shoulder 62. A ring of radial holes 63 in the tubular stem 38 accommodate balls 64, and an internal circumferential groove 65 is formed in the sleeve 39 in such a position as to lie opposite the holes 63 when the balls 22 are engaged by the part 49 of the camming surface 46. As shown in Figure 3, the rod 58, when lifted by contraction of the bellows 52, has its full-diameter part engaging the balls 64, the said balls being then held in positions in which they project into the groove 65 so as to lock the sleeve 39 to the tubular stem 38.

A central aperture 66 in the bottom of the lower cup-shaped portion 31 of the body provides communication between the interior of said portion around the ebllows and the underside of the plug. Holes 67 in the base of the centre part 27 of the body connect the interior of the bellows 52 with the upper side of the plug. The plug therefore constitutes a completely fluid-tight barrier when located in the stack pipe, the bellows 52 being subject to any pressure differential acting between its lower and upper sides.

A loop 68 to receive a lifting hook is welded into the cap 43, a weighted bell-crank lever 69 (Figure 4) being pivoted at 71 between cheeks 72 and having an upstanding arm 73 which, by a weight on the other arm 74, is urged to a position to prevent disengagement of a suitably formed hook 75. A pin 76 extending from the top of the rod 58 engages, when the plunger 44 is lowered and the rod 58 raised to the positions shown in Figure 1, with the arm 74 to tilt the bell-crank lever and release the hook 75.

Rotation of the plunger 44 in the body is prevented by a stud 77 (Figure 4) fixed to the base of the centre body part 27 and extending into a hole 78 in the plunger. In order that it may be readily possible to test for leakage of gases past the packings between the plug and the stack pipe and between the bellows ring 53 and the body, a groove 79 is provided in the centre body part 27 between the packing rings 23 and 25, and a similar groove 81 is provided between the two packing rings 55, these grooves being connected respectively, by pipes 82 (Figure 3) and 83 (Figure 4) passing through openings in the plunger, to adaptors 84 and 85 at the top of the latter, normally sealed by screw plugs 86, to which can be connected suitable pressure gauges mounted, for example, in the top of the dome unit 15.

The cup member 59 has an annular groove around its rim in which is mounted a packing ring 87 of round cross section, the said ring engaging the surface of the ring 53 when the bellows are contracted and isolating the said bellows from the under-side of the plug, so that excessive pressure produced below the plug is unable to damage the bellows.

When the plug is to be inserted in a stack pipe it is suspended from the winch 16, Figure 1, by the hook 75, the weight of the body causing it to drop relative to the sleeve 39 which supports the plunger 44 in a raised position relative to the body, as shown in Figure 4. The balls 22 are thus free to move inwardly. There being no pressure differential acting across the plug, since it is not in a sealing position, the bellows 52 are extended, and the rod 58 is in its downward position relative to the tubular stem 38, so that the reduced portion 61 of the rod 58 is opposite the holes 63, and the balls 64 can move inwardly clear of the groove 65. The pressure in the stack-pipe is assumed to be above atmospheric pressure, and this pressure is also present in the dome unit 15 when the valve is opened. The plug is lowered through the coupling member until the shoulder 21 rests on the surface 17 thus supporting the weight of the body and is then as shown in Figure 4. Further operation of the winch allows the plunger 44 to move downwardly relative to the body until it reaches the position shown in Figure 3, the camming surface 46 urging the balls 22 outwardly into the groove 18 and pressing them into engagement with the upper curved surface of the said groove so that the shoulder 21 is pressed firmly down on to the surface 17. The groove 65 is now opposite to the holes 63. The plug now forms a fluid-tight partition between the spaces below and above it, so that if gas is drawn off from the dome unit 15, the pressure in the stack pipe contracts the bellows 52, raises the rod 58, and causes the balls 64 to be moved outwardly to lock the sleeve 39 against upward movement. With the sleeve 39 so locked, the plunger is unable to rise sufficiently to release the balls 22, so that the plug cannot be released.

Gas from the stack pipe which has entered the dome unit and coupling member can then be drawn off and the dome unit removed to enable the coupling member to be serviced or replaced, no leakage of gases from the stack pipe being able to take place.

Figure 5:
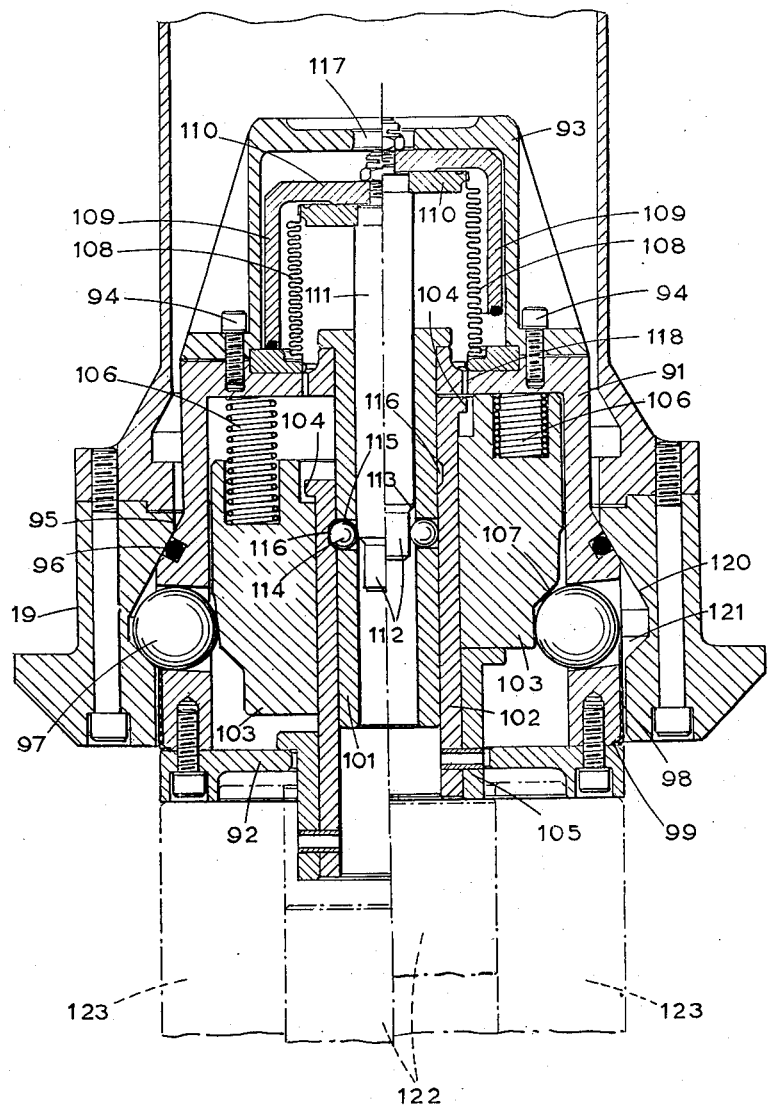
Figure 5 is a sectional elevation of a modified form of plug adapted for insertion upwardly into a downwardly facing opening, the left-hand half of the figure showing the plug in the locked position and the right-hand half showing it in the unlocked condition.

Referring now to Figure 5 of the drawings, this shows a plug having many features in common with that shown in Figures 2 to 4, but the plug of Figure 5 is arranged for insertion upwardly into a downwardly opening stack-pipe.

The plug comprises an inverted cup-shaped body 91 to the rim of which is bolted an annular plate 92 forming a partial closure of the lower end of said body and an inverted cup-shaped extension 93 which is bolted at 94 to the closed upper end of the body 91. The body 91 is formed externally with an upwardly-facing frusto-conical shoulder 95 grooved to receive a round-section packing ring 96, and, below the shoulder 95 a ring of radial holes is provided in the body, each such hole having slidable in it a locking ball 97 prevented from outward escape through the hole by the projection over the outer end of said hole of a thin metal sleeve 98 having a flanged end 99 clamped between the rim of the body 91 and the plate 92.

A tubular stem 101 extending downwardly from the top of the body 91 has slidably mounted on it a sleeve 102 on which is in turn slidably mounted a plunger 103. The sleeve 102 has an external flange 104 at its upper end and external collar 105 at its lower end, the axial movement of the plunger 103 relative to the sleeve 102 being limited by said flange and collar. The plunger 103, which is urged downwardly by spring 106 taking their abutment on the top of the body 91, has a camming surface 107 on its periphery such that, in the upper position of the plunger shown on the right-hand side of Figure 5 the balls 97 can move inwardly so as to be within the diameter of the body, whilst as the plunger moves downwardly to the lower position shown on the left hand side of Figure 5, the balls are forced outwardly so as to project from the body.

The cup-shaped extension 93 houses a bellows 108 and cup member 109 corresponding to the parts 52 and 59 in Figures 3 and 4 but inverted, a disc 110 at the movable end of the bellows carrying a rod 111 which extends downwardly into the tubular stem 101 and has a reduced lower end 112 joined to its full diameter by a downwardly facing frusto-conical shoulder 113 to cooperate with balls 114 in radial holes 115 in the tubular stem 101, which balls are adapted to enter a circumferential groove 116 in the sleeve 102 to lock the sleeve to the stem. The cup-shaped extension 93 is open to the upper side of the plug at 117, and the interior of the bellows is in communication with the lower side of the plug through holes 118.

The plug cooperates with a downwardly-opening stack pipe 119 in the end of which is formed a downwardly facing frusto-conical surface 120 leading downwardly into a circumferential groove 121.

This plug is manipulated by means of two coaxial rams, indicated in chain-dotted lines in Figure 5 at 122 and 123 respectively, the inner ram 122 acting on the lower end of the sleeve 102, whilst the outer ram 123 acts on the plate 92 at the underside of the body 91.

It will be assumed that the stack pipe 119 opens downwardly into a coupling member similar to that shown in Figure 1 but mounted in an inverted position, and that a dome unit is provided for attachment to the lower end of the coupling member, which dome unit is provided internally with means for manipulating the rams 122, 123.

To insert the plug, it is supported on the rams in the dome unit, the ends of the rams being in a common plane, so that the sleeve 102 and plunger 103 are raised relative to the body 91, and the balls 97 are free to retract into the body. The weight of the body is sufficient to compress the springs 106. There being no pressure differential across the plug, the bellows 108 is extended and the balls 114 are free to retract inwardly. The relative positions of the parts of the plug are as shown on the right-hand side of Figure 5.

The rams 122, 123 are then raised simultaneously to lift the plug, without altering the relation of its parts, until the shoulder 95 engages the surface 120. The ram 122 is then lowered independently of the ram 123 to allow the sleeve 102 to move downwardly relative to the body 91, the camming surface 107 urging the balls 97 outwardly into engagement with the inclined lower side of the groove 121, so that they cause an upward thrust on the plug which presses the shoulder 95 against the surface 120. The groove 116 is brought opposite to the holes 115. Both rams 122 and 123 can then be retracted, leaving the plug in position. If the pressure below the plug is then reduced, the bellows 108 is contracted and the rod 111 moves downwardly to urge the balls 114 outwardly into the groove 116, thus locking the plunger 103 against upward movement.

In the case of the plugs shown in Figures 2 to 4 and in Figure 5, removal is effected by a reversal of the insertion procedure, the first step being to enclose the outer end of the plug and equalise the pressure across it to allow the plunger to become unlocked.

Plugs according to the invention, as well as being used for closing stack-pipes and like openings may be used to support apparatus or instruments in such openings in such a way that such apparatus or instruments can be manipulated or controlled, or can transmit data to, the outside of the plug.

Figure 6:
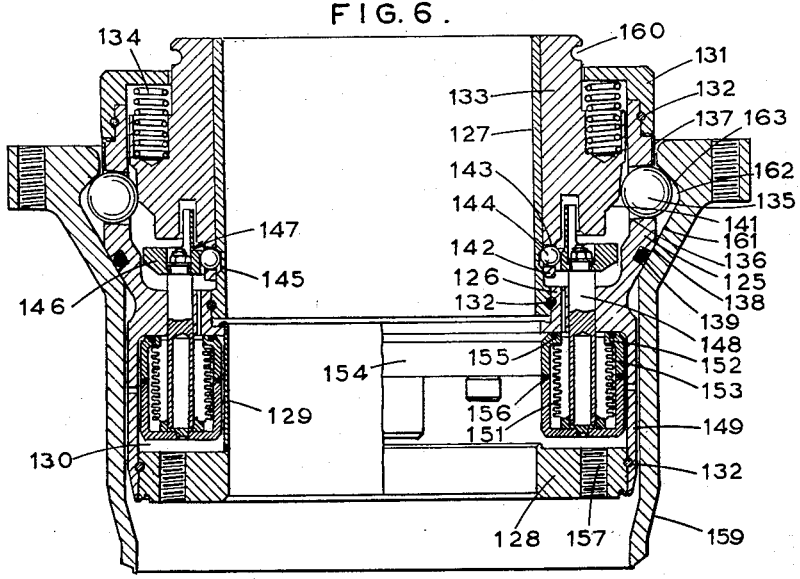
Figure 6 is a sectional elevation similar to Figure 3 but showing a plug having a clear passage through its centre, the plug being locked in position in a stack-pipe.
Figure 7:
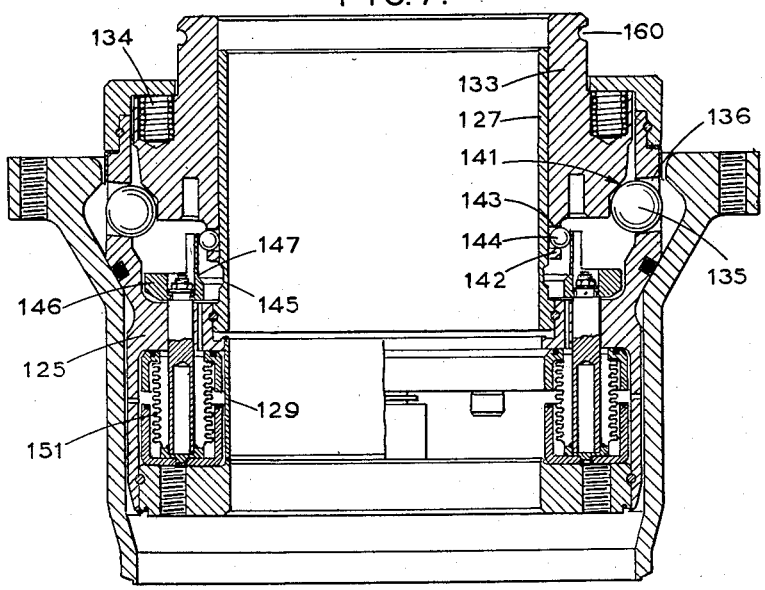
Figure 7 is another sectional elevation of the plug shown in Figure 6, taken in the same plane as Figure 6 but showing the plug in the unlocked condition.

For example, Figures 6 to 8 of the drawings show a plug having a large central opening and having provision for attaching apparatus such as a winch to its underside so that operations can be carried out inside a stack-pipe in which it is mounted without, assuming that said apparatus is gas-tight, any leakage of gas from the stack-pipe.

Referring to Figures 6 to 8, the plug comprises a tubular body 125 formed intermediate its ends with an internal flange 126, a sleeve 127 secured to the inner periphery of the flange and extending upwardly therefrom, a ring 128 secured to the body 125 so as to form a second internal flange at the lower end thereof, and a second sleeve 129 extending between the ring 128 and the flange 126 to form the inner wall of an annular cavity 130 between the said ring and flange. A ring 131 of L-shape in cross-section is secured to the upper end of the body 125, the body 125 and ring 131 having overlapping portions as shown. The sleeve 127, ring 128 and ring 131 are conveniently secured to the body by wires 132 engaging mating grooves in the parts to be secured together.

Slidably mounted on the exterior of the sleeve 127 is an annular plunger 133 urged downwardly by springs 134 taking their abutment on the ring 131. Balls 135 are mounted in radial holes 136 in the body 125, their outward movement being limited by the edge of a thin shell 137 having a flange which is clamped between the body 125 and the ring 131, the said edge slightly overlapping the holes 136. Below the holes 136, the outer surface of the body 125 is formed with a downwardly-facing inclined shoulder 138, grooved circumferentially to receive a packing ring 139. The plunger 133 is formed with a camming surface 141 similar to the camming surface 46 in Figures 2 to 4, which cooperates with the balls 135. The plunger 133 has a thin downward extension 142 in which are formed a plurality of holes 143, to accommodate balls 144, the said holes, when the plunger is in the position shown in Figure 6, being opposite to a circumferential groove 145 in the sleeve 127. A ring 146, mounted between the flange 126 on the body and the plunger 133 is formed with a camming surface 147 to cooperate with the balls 144 and push them inwardly when the ring 146 is moved upwardly, the ring 146 being carried on a plurality of posts 148 passing through apertures in the flange 126 and secured at their lower ends to cups 149 to which are fixed, in a fluid-tight manner, the lower ends of bellows 151. The bellows 151, which may be four in number, are arranged in spaced relation around the annular cavity 130, their upper ends being secured in a fluid-tight manner to shoulders 152 at the upper ends of openings 153 in a ring 154 bolted up against the underside of the flange 126. The upper face of the ring 154 has formed in it a plurality of annular grooves each surrounding one of the openings 153, and in each of these grooves is fitted a packing ring 155 which engages the flange 126 to ensure a fluid-tight joint around the upper end of the bellows. The cups 149 are grooved about their rims to receive packing rings 156. The interior of each bellows is open to the upper side of the plug through a hole 150 in the flange 126.

The ring 128 is formed with a circumferential series of screw-threaded holes 157 to enable apparatus to be bolted thereto, and these holes provide a communication between the cavity 130 and the underside of the plug. As shown in Figure 8, the ring 146 has resting on it the lower end of a rod 158 extending upwardly through a hole in the plunger 133, the position of the upper end of the plunger relative to the ring 131 indicating the position of the ring 146. The upper end of the plunger 133 is grooved externally at 160 to enable the plug to be engaged and supported by a grab.

The plug is adapted for use in a stack-pipe 159 having an upwardly-facing frusto-conical surface 161 to engage the shoulder 138, and, above the surface 161, a circumferential groove 162 having an upper wall 163 oppositely inclined to the surface 161.

The plug shown in Figures 6, 7 and 8 is manipulated by means of a grab (not shown) engaging in the groove 160, the grab being attached to the cable of a winch such as that shown in Figure 1. The plug, with any apparatus which it is required to carry bolted to its underside, is suspended in the dome unit by means of the grab before the dome unit is brought into position above the stack pipe and mated with the coupling member (not shown) which is assumed to be mounted on the top thereof. There being no pressure differential acting on the plug, the bellows 151 are extended and the ring 146 occupies a position such that the balls 144 are free to move out of the groove 145. The plunger 133 can therefore move away from the position in which the holes 143 are in register with the groove 145, and, owing to the fact that the plug is supported by the plunger 133, the body 125 moves downwardly relative to the said plunger under its own weight. The parts of the plug then occupy the relative positions shown in Figure 7, the balls 135 being free to retract into the holes 136. The plug is then lowered until the shoulder 138 rests on the surface 161, after which the plunger 133 moves downwardly relative to the plug body, causing the camming surface 141 to urge the balls 135 outwardly into the groove 162 and against the surface 163, so that the shoulder 138 is pressed firmly against the surface 161. As with the previously described embodiments, a pressure differential established across the plug with the higher pressure on its underside locks the plunger 133 in position relative to the body 125, the contraction of the bellows 151 raising the ring 146 to displace the balls 144 inwardly into the groove 145, which lies opposite to the said holes when the balls 135 are projected into the groove 162, as shown in Figure 6

The plug shown in Figures 6, 7 and 8 may be modified for use in a downwardly-opening stack pipe by reversing the relative positions of the shoulder 138 and the balls 135, reversing the direction of movement of the ring 146 for urging the balls 144 to their locking position, and reversing the bellows 151 so that they are compressed by pressure above the plug. Conveniently, in such a modified plug, the bellows are arranged above the plunger 133, the changes as compared with the plug shown in Figures 6, 7 and 8 being analogous to those applied to the plug of Figures 2 to 4 to produce the plug of Figure 5.

Figure 9:
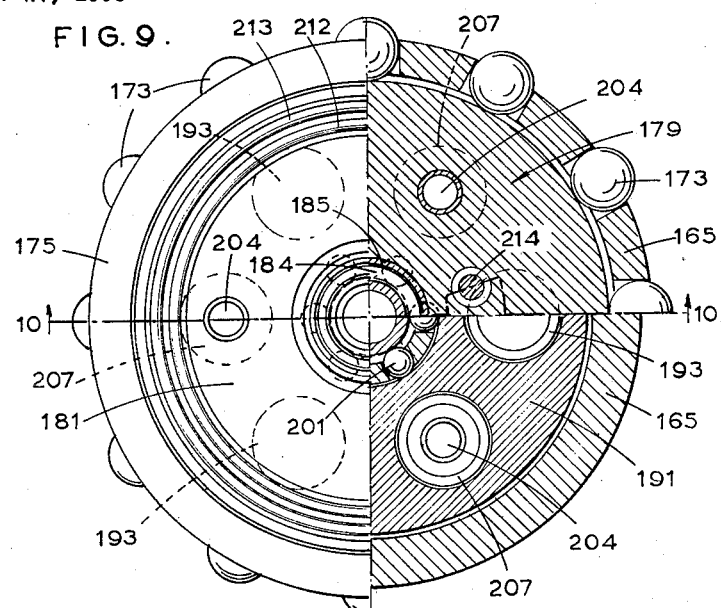
Figure 9 is a plan view, partly in section, of another form of plug according to the invention, the upper and lower parts of the right-hand side of the figure being respectively in section on the lines A—A and B—B of Figure 10.
Figure 10:
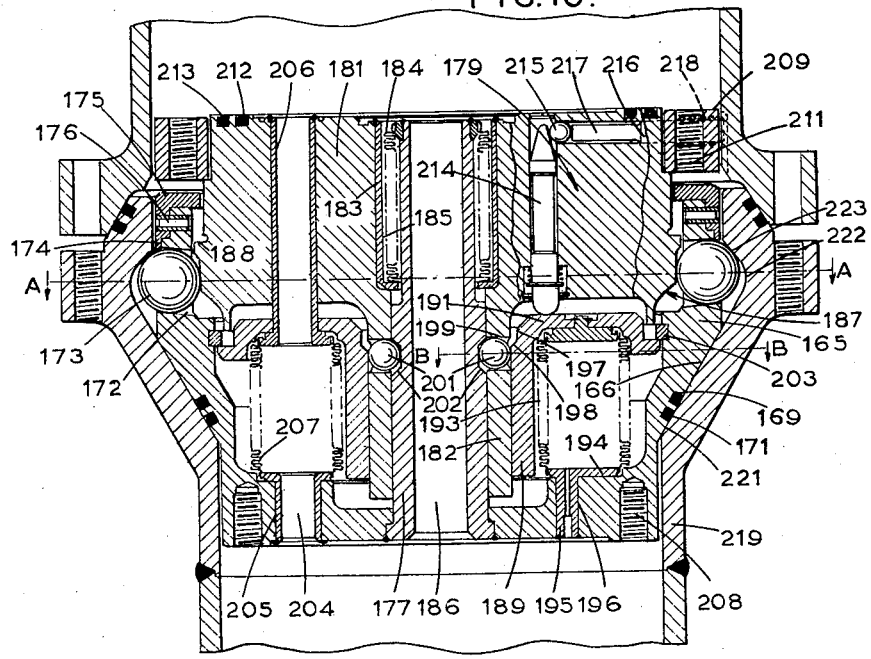
Figure 10 is a sectional elevation taken on the line 10—10 of Figure 9.

The plug shown in Figures 9 and 10 like that shown in Figures 6, 7 and 8, is provided with a central through passage, but in this embodiment of the invention the passage is only of small diameter. In addition, one or more other through passages, eccentrically disposed, may be provided in the plug.

Referring to the drawing, the plug comprises a cup-shaped body 165 formed externally with a downwardly-facing shoulder 166 in which are cut two spaced circumferential grooves to receive packing rings 167, 171. An externally cylindrical part of the body above the shoulder 166 is formed with a series of radial holes 172 in each of which is mounted a ball 173 retained against outward escape from the hole by the edge 174 of an L-section ring 175 secured by dowels 176 to the rim of the body 165, the ring 175 having its other edge projecting radially inwardly beyond the said rim. A tubular stem 177 extends upwardly from the bottom of the body 165, at the centre thereof, the stem 177 having an external reduced portion 178 at its upper end. Slidable on the stem 177 is a plunger 179 having a disc-like upper portion 181 and a sleeve-like lower portion 182, the upper end of the bore through the said plunger being enlarged at 183. In the said enlarged part of the bore is mounted a flexible bellows 184 secured in a fluid-tight manner at its upper end to the top of the stem 177 and at its lower end to a rigid tube 185 the upper end of which is welded to the plunger, the said bellows thus consituting a fluid-tight closure for the sliding joint between the stem and the plunger. The bore of the stem 177 forms a central passage 186 through the plug.

The disc-like upper portion 181 of the plunger 179 has formed on its outer edge a camming surface 187 cooperating with the balls 173 as described in connection with the previous examples. Lifting of the plunger 179 to a position (not shown) in which a shoulder 188 thereon engages the ring 175 allows the balls 173 to move inwardly within the periphery of the body 165, whereas lowering of the plunger 179 to the position shown in the drawings causes the balls to be urged to the outwardly-projecting positions shown.

A sleeve 189, slidable on the sleeve-like portion 182 of the plunger 179, has a wide flange 191 at its upper end, to the underside of which are secured end plates 192 of a plurality of bellows 193. The lower ends of these bellows are each secured to an end plate 194 having an integral tubular stem 195 which passes through a hole 196 formed in the bottom of the body 165. The bores of the tubular stems 195 provide communication between the interiors of the bellows 193 and the underside of the plug, and the space around the bellows is in communication with the upper side of the plug.

The upper end of the sleeve 189 is enlarged internally at 197, a frusto-conical shoulder 198 connecting the enlarged part with the main bore. The sleeve-like portion 182 of the plunger 189 is formed with a circumferential series of radial holes 199 in which are mounted balls 201, and the tubular stem 177 is formed with a circumferential groove 202. When the plunger 189 is in the position shown in the drawings, and the balls 173 are projected, the groove 202 is in register with the holes 199, and the sleeve 189 is able to move upwardly to the position shown and hold the balls 173 in the groove 202. The upward movement of the sleeve 189 is limited by engagement of the flange 191 thereon with a stop ring 203 inserted in a groove in the body 165. In the absence of pressure acting in the bellows 193 to raise it, the sleeve 189 drops under its own weight to a position in which the enlarged part 197 of its bore is opposite the groove 202, and the balls 201 can move outwardly clear of the groove 202.

Additional passages through the plug, offset from its centre, are provided. Three such passages 204 are shown in Figure 9, and, as can be seen in Figure 10, each such passage is formed by a tube 205 secured in a hole in the body 165, and a second tube 206, aligned with the tube 205 and secured in a hole in the disc-like portion 181 of the plunger 179, the adjacent ends of the two tubes being connected one to the other in a fluid-tight manner by a flexible bellows 207.

The underside of the plug has screw-threaded holes 208 in circumferential array adjacent its edge, and a removable flange 209 secured to the top of the plunger 179 has a similar array of screw-threaded holes 211. The upper surface of the disc-like portion 181 of the plunger is formed with two annular grooves 212, 213 to receive packing rings. It is thus possible to secure to the upper side of the plug a cover, housing instruments or apparatus, or an individual piece of apparatus, which makes a fluid-tight joint with the plunger and in communication with the underside of the plug through the passage 186 or one or more of the passages 204. Alternatively, apparatus may be bolted to the underside of the plug and power cables or other connections thereto may be taken through one or more of the passages in the plug.

In order that a visual indication may be given of the position of the sleeve 189, a rod 214, slidable in a bore in the dish-like portion of the plunger 179 parallel to the axis of the said plunger, rests at its lower end on the flange 191 and has a tapered upper end engaging with a ball 215 in a radial bore 216 in the plunger, the ball 215 resting against the end of a rod 217 slidable in the bore 216 and urged inwardly by a spring 218. Movement of the sleeve 189 to its upper position causes the rod 217 to project radially from the periphery of the plug.

The plug shown in Figures 9 and 10 is adapted to be mounted in a stack-pipe 219 having an upwardly-facing frusto-conical surface 221 to receive the shoulder 166, and a peripheral groove 222, above the surface 221, to receive the balls 173. The groove 222 has its upper wall 223 inclined oppositely to the surface 221, so that the balls 173, when urged outwardly thereagainst, press the shoulder 166 against the surface 221.

The plug shown in Figures 9 and 10 is manipulated in much the same manner as the plug shown in Figures 6, 7 and 8 except that no provision is made on the plug itself for attaching a hook or grab.

If a cover is attached to the upper side of the plug, this may be provided with means for engagement by the hook or grab, but if the plug is used without anything attached to its upper side, it may be suspended by means of eyebolts or the like screwed into the holes 211.

The plug shown in Figures 9 and 10, like the plugs shown in the preceding figures, may be modified for upward insertion in a downwardly-facing opening.

It will be understood that any of the plugs described herein may be employed in horizontal or inclined openings as well as in vertical openings.

Both the main and the additional locking means have been described, in connection with all the examples herein, as embodying locking members in the form of balls. Rollers may, if desired, be used in the place of balls, or other suitable locking members may be employed.

I claim:
1. A plug for closing a cylindrical passageway having a circumferential groove in the wall thereof and making a fluid tight joint with said wall, said plug comprising a body, a shoulder on said body to engage a mating surface in the passageway, packing means on said shoulder, primary locking members mounted in radial apertures in said body for movement into said circumferential groove, a plunger mounted for axial sliding movement in said body, a camming surface on said plunger operative on axial sliding movement of the plunger in one direction to displace said locking members outwardly into said groove, a sleeve fixed to said body and extending axially through said plunger, secondary radially movable locking members operative to lock said plunger to said sleeve and an axially slidable member having a camming surface cooperating with said secondary locking members to displace them into locking position, said axially slidable member being responsive to pressure on the inner side of the plug for engaging said secondary locking members.

2. A plug according to claim 1, wherein the secondary locking members are associated with inner and outer coaxial tubular members one fixed to the plug body and the other movable by the plunger, the said locking means comprising balls mounted in radial holes in one of said tubular members and adapted to extend radially into a circumferential groove in the other of said tubular members.

3. A plug according to claim 2, wherein the balls are moved into the circumferential groove by a camming surface on a member movable relative to the body, the said member being connected to the body by at least one flexible bellows the interior of which is connected to one side of the plug and the space surrounding which is connected to the other side of the plug.

4. A plug according to claim 3, wherein the member carrying the camming surface for actuating the balls of the additional locking means is a rod co-axial with the plug.

5. A plug according to claim 3, wherein the member carrying the camming surface for actuating the balls of the additional locking means is a sleeve or ring coaxial with the plug.

6. A plug according to claim 1 wherein the shoulder faces downwardly and is positioned below the radially movable primary locking members.

7. A plug according to claim 1, wherein the shoulder faces upwardly and is positioned above the radially movable locking members.

8. A plug according to claim 1 in which the plunger is biased towards a position in which the first locking members are extended.

9. A plug according to claim 1 in which said axially slidable member is responsive to a pressure differential across the plug to retain the secondary locking members in position to hold the first locking members extended.

10. A plug according to claim 1 in which said primary locking members cooperate with the side of said groove to produce an axial thrust urging said shoulder against said mating surface.

References Cited in the file of this patent
UNITED STATES PATENTS

| | | |
|---|---|---|
| 1,659,202 | Jewell | Feb. 14, 1928 |
| 1,858,013 | Heins | May 10, 1932 |
| 2,298,552 | Du Vall | Oct. 13, 1942 |
| 2,581,537 | Maisch | Jan. 8, 1952 |
| 2,751,108 | Getz et al. | June 19, 1956 |